United States Patent
Dragt

[11] 4,011,003
[45] Mar. 8, 1977

[54] ELECTROMAGNETICALLY CONTROLLABLE PIVOTING MIRROR DEVICE

[75] Inventor: Jan Cornelis Willem Dragt, Eindhoven, Netherlands

[73] Assignee: U.S. Philips Corporation, New York, N.Y.

[22] Filed: Jan. 26, 1976

[21] Appl. No.: 652,535

[30] Foreign Application Priority Data
Mar. 10, 1975  Netherlands .................... 7511634

[52] U.S. Cl. .................................. 350/6; 350/285
[51] Int. Cl.² ................. G02B 27/17; G05D 25/00
[58] Field of Search ........................... 350/6, 7, 285

[56] References Cited
FOREIGN PATENTS OR APPLICATIONS

| 354,117 | 6/1961 | Switzerland ........................... 350/7 |
| 1,393,896 | 5/1975 | United Kingdom .................. 350/6 |

Primary Examiner—John K. Corbin
Assistant Examiner—Jon W. Henry
Attorney, Agent, or Firm—Frank R. Trifari; Simon L. Cohen

[57] ABSTRACT

An electromagnetically controllable pivoting device for pivoting a reflecting surface of a pivoting mirror about pivotal axes parallel to said surface with the aid of electrical control signals, more particularly intended for a video disc player in which a light beam is produced by means of a light source, which beam is aimed at an information track of a rotating optically readable video disc by means of the reflecting surface of the pivoting mirror. The mirror is supported by a bellows body of an elastically deformable plastic, which bellows body is provided with at least one rotation-symmetrical fold which is concentric with the optical center of the reflecting surface.

2 Claims, 2 Drawing Figures

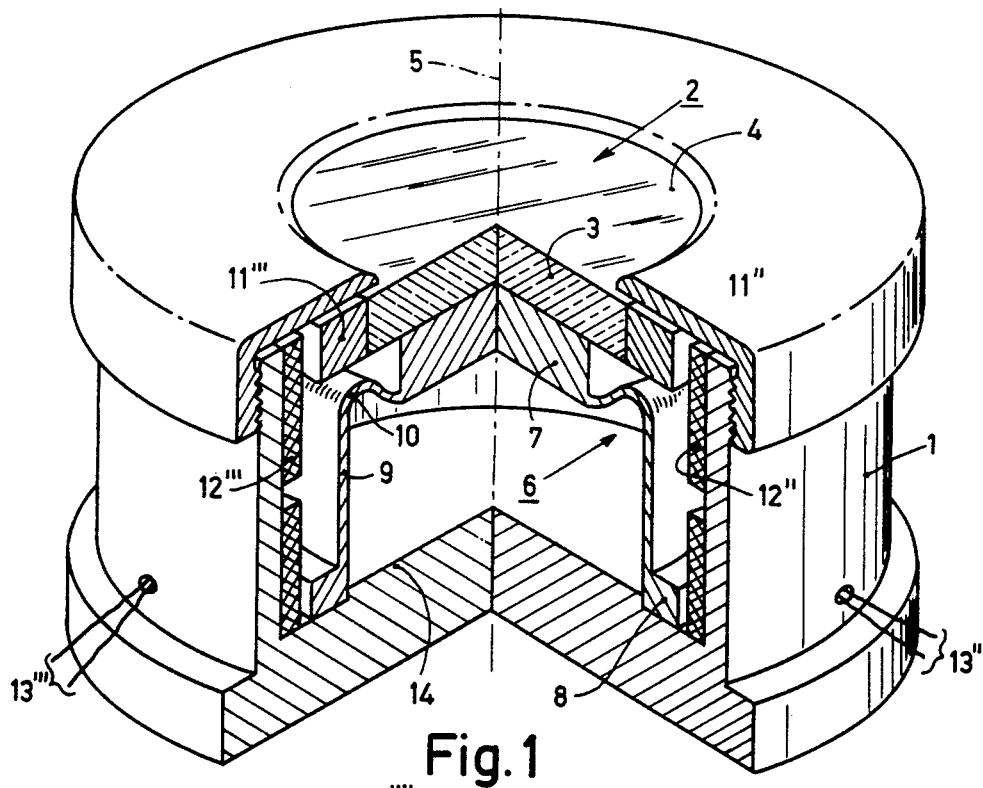
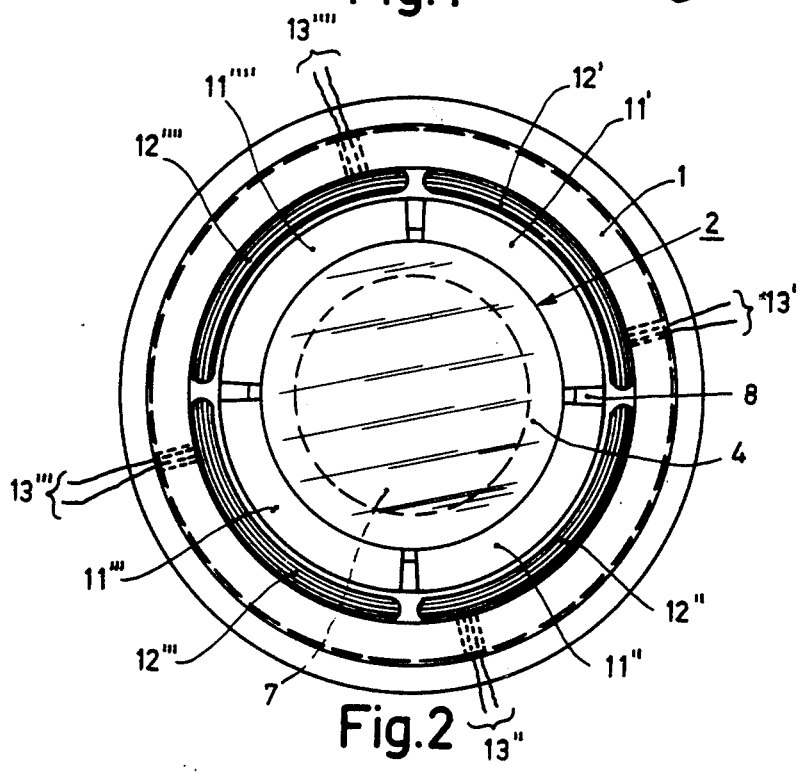

ELECTROMAGNETICALLY CONTROLLABLE PIVOTING MIRROR DEVICE

The invention relates to an electromagnetically controllable pivoting mirror device for causing a reflecting surface to pivot about pivotal axes parallel to the reflecting surface under the influence of electrical control signals, more particularly destined for both radially and tangentially following the information track of a rotating optically readable video disc with the aid of a light spot produced by a light source, and comprising a frame, a mirror which relative to the frame is pivotable about the said pivotal axes, which mirror comprises a base with a reflecting surface on one side thereof, supporting means for pivotably supporting the mirror on the frame and comprising a first portion which is connected to the mirror and a second portion which is connected to the frame, as well as a third elastically deformable intermediate portion of an elastic plastic, and electromagnetic control means comprising permanent magnets and/or electrical coils.

Swiss Pat. Specification No. 354,117 describes a pivoting mirror device in which the mirror comprises a permanent-magnetic body on which a reflecting layer is deposited. Thus, the base of the mirror also constitutes one of the electromagnetic control means, namely the permanent magnetic part thereof which is connected to the mirror. The base is rendered pivotable by embedding it in a rubber-like compound which is located between the pole-pieces of a U-shaped yoke on which a control coil is mounted. By energizing the coil the mirror is subjected to a torque so that it performs a pivoting movement in the elastic material in which it is embedded. It is alternatively possible to mount the mirror in a rubber-like compound which is located in a space between the pole-pieces of two mutually perpendicular yokes which are each provided with an associated control coil, so that the reflecting surface can pivot about two mutually perpendicular axes.

The known mirror was intended for use in television receivers of the type in which a light beam instead of an electron beam is controlled. In view of the application pursued, in particular with respect to the dimensions of television tubes at that time, only a slight movability of the mirror was required, so that completely embedding the mirror leaving the reflecting surface free presented a satisfactory solution for the object in view. In recent years there has been a substantial revival of the interest in pivoting mirror devices in view of applications in video disc players. At present video disc players are being developed, which enable video information contained on a rotary disc to be read by means of a light beam, for example a laser beam which is aimed at the disc with the aid of optical means, which means include a pivoting mirror device, for accurately following and reading the tracks on the disc, see for example the articles "The Philips VLP System," Philips Technical Review 33, 178–193, 1973, No. 7; "Ein neues Bildplattensystem mit transparanter Folie," Funkschau, Heft 20, 2286 – 2288, 1974, and "The MCA Disco-Vision System," Journal of the SMPTE, volume 83, July 1974. For applications in such video disc players the pivoting mirror device should comply with other requirements than that which is described in the afore-mentioned Swiss Patent Specification. In particular, a substantially greater movability of the mirror is required, i.e. using a comparatively low power a comparatively large deflection of the pivoting mirror should be obtainable at a comparatively low frequency. The pivoting mirror device is included in an automatic control system, which serves for following the tracks on the video disc with the read beam. The speed of revolution of of the video disc is 1500 or 1800 revolutions per minute, depending on the mains frequency which may be 50 or 60 Hz, respectively. For following the track the pivoting mirror device must be capable of following an oscillation of the track with an amplitude of $200\mu$ at an oscillating frequency of 25 Hz.

It is an object of the invention to provide a pivoting mirror device which is specifically suitable for use in video disc players and the invention is characterized in that said third portion of the supporting means comprises a substantially rotation-symmetrical bellows body which comprises at least one fold which is concentric with the optical centre of the reflecting surface. Thus, in the pivoting mirror device in accordance with the invention the pivoting mirror is supported by an elastically deformable body, to be referred to as bellows hereinafter. The bellows required for supporting the mirror can be manufactured entirely by simple state-of-the-art methods from a suitable elastic, for example, rubber-like, plastic. Such a component is highly insensitive to external mechanical influences and moreover has the property of resuming its original shape in the absence of external forces. Thus, the invention provides a pivoting mirror device which can be both sensitive and mechanically highly robust, and which moreover requires no separate means for returning and keeping the mirror in the neutral position in the absence of driving torques.

An embodiment of the invention in which the bellows consist of one unit is characterized in that said first portion, which is connected to the mirror, comprises a substantially disc-shaped body, the second portion which is connected to the frame substantially consists of a ring which is concentric with the disc but which is axially shifted relative thereto, and the third portion comprises a cylindrical casing which at its one side adjoins the ring and at its other side via the concentric fold(s) adjoins the substantially disc-shaped body. Such a shape of the bellows is favourable for reasons of manufacturing technology and, moreover provides sufficient space to allow the coils to be arranged adjacent the mirror.

The invention will be described in more detail with reference to the drawing, in which:

FIG. 1 is a perspective side view, for a quarter part in cross-section, of a pivoting mirror device in accordance with the invention in cylindrical form, and FIG. 2 is a plan view of the pivoting mirror device in accordance with FIG. 1m a cover at the top being removed for the sake of clarity.

The pivoting mirror device in accordance with the Figures comprises a frame 1, which is substantially cylindrical and which has a closed flange-shaped base, by means of which it can be mounted in a video disc player in a suitable manner. On this frame a pivoting mirror 2 is mounted which comprises a ceramic base 3 on which an extremely thin reflecting layer 4 is deposited. The mirror is pivotable about every axis perpendicular to the neutral optical axis 5. This is the centre line of the cylindrical frame 1. In the absence of control voltages the centre line is perpendicular to the reflecting surface 4 of the mirror 2 and extends through the centre thereof.

The pivoting mirror is pivotably supported relative to the frame 1 by means of the elastically deformable bellows 6. These bellows comprise a first portion 7, which is connected to the mirror, as well as a portion 8, which is connected to the frame. These two portions are interconnected by means of an elastically deformable intermediate portion of an elastic plastic, which portion consists of a substantially rotation-symmetrical bellows body 9, which comprises a fold 10 which is concentric with the axis 5.

At the circumference of the mirror 2 four permanent magnets 11 are glued. In the Figures the various magnets are distinguished from each other by means of accents. For the sake of simplicity the accents are omitted in the description in the case that mutually identical components are discussed in general. The permanent magnets 11 each co-operate with an associated control coil 12. Each of the control coils is connected to the electronic control circuit which includes the pivoting mirror device by means of two coil terminations 13.

The bellows 6 are integrally manufactured from a suitable elastic, for example rubber-like, plastic. The portion 7 which is connected to the mirror 2 takes the form of a disc-shaped body onto which the mirror can simply be glued. The bellows are connected to the frame 1 by means of the annular flange 8 which is concentrically disposed on a raised portion 14 in the centre of the frame. Also in this case fixation may be effected by glueing. The ring 8 is axially shifted relative to the disc 7 and is connected to the disc via the cylindrical portion of the bellows body 9 which via the fold 10 adjoins the disc 7.

In the embodiment shown an enclosed space is located at the inside of the bellows 6. Such an enclosed space may be desirable so as to increase the rigidity of the device against forces in the direction of the axis 5. However, in other embodiments it is alternatively possible to make the chamber communicate with the surrounding atmosphere by means of openings. This has the advantage that barometric variations have no effect on the axial position of the reflecting surface 4.

What is claimed is:

1. An electromagnetically controllable pivoting mirror device for causing a reflecting surface to pivot about pivotal axes parallel to the reflecting surface under the influence of electrical control signals, more particularly destined for both radially and tangentially following the information track of a rotating optically readable video disc with the aid of a light spot produced by a light source, and comprising:

a frame, a mirror which relative to the frame is pivotable about the said pivotal axes, which mirror comprises a base with a reflecting surface on one side thereof, supporting means for pivotably supporting the mirror on the frame and comprising a first portion which is connected to the mirror and a second portion which is connected to the frame as well as a third elastically deformable intermediate portion of an elastic plastic, and electromagnetic control means comprising permanent magnets and/or electrical coils, characterized in that said third portion of the supporting means comprises a substantially rotation-symmetrical bellows body, which comprises at least one fold which is concentric with the optical center of the reflecting surface.

2. A pivoting mirror device as claimed in claim 1, with a supporting means which is integrally manufactured from an elastic plastic, characterized in that said first portion, which is connected to the mirror, comprises a substantially disc-shaped body, the second portion, which is connected to the frame, substantially comprises a ring which is concentric with the disc, but which is axially shifted relative thereto, and the third portion comprises a cylindrical casing which at its one side adjoins the ring and at its other side via the concentric fold(s) adjoins the substantially disc-shaped body.

* * * * *

UNITED STATES PATENT AND TRADEMARK OFFICE
CERTIFICATE OF CORRECTION

PATENT NO. : 4,011,003
DATED : March 8, 1977
INVENTOR(S) : JAN CORNELIS WILLEM DRAGT It is certified that error appears in the above—identified patent and that said Letters Patent are hereby corrected as shown below:

ON THE TITLE PAGE

Section [30] should read as follows:

--[30]   Foreign Application Priority Data

October 3, 1975   Netherlands................7511634--

Signed and Sealed this

Tenth Day of May 1977

[SEAL]

Attest:

RUTH C. MASON
*Attesting Officer*

C. MARSHALL DANN
*Commissioner of Patents and Trademarks*